(12) United States Patent
Lee

(10) Patent No.: US 6,577,624 B1
(45) Date of Patent: Jun. 10, 2003

(54) SYSTEM FOR CONTROLLING A TELEPHONY DEVICE BUS IN A SWITCHING SYSTEM

(75) Inventor: Seung-Wang Lee, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/371,613

(22) Filed: Aug. 10, 1999

(30) Foreign Application Priority Data

Aug. 19, 1998 (KR) ........................................ 1998-33659

(51) Int. Cl.[7] .................................................. H04J 3/02
(52) U.S. Cl. ........................................ 370/359; 370/463
(58) Field of Search ................................ 370/359, 419, 370/463; 379/93.05

(56) References Cited

U.S. PATENT DOCUMENTS

| | | | |
|---|---|---|---|
| 5,265,237 A | 11/1993 | Tobias et al. | |
| 5,321,818 A | 6/1994 | Wendling et al. | |
| 5,371,736 A | 12/1994 | Evan | |
| 5,414,814 A | 5/1995 | McKim | |
| 5,497,373 A | * 3/1996 | Hulen et al. | 370/259 |
| 5,583,856 A | * 12/1996 | Weir | 370/359 |
| 5,590,372 A | 12/1996 | Dieffenderfer et al. | |
| 5,604,740 A | * 2/1997 | Pinault et al. | 370/463 |
| 5,748,916 A | 5/1998 | Conway et al. | |
| 5,812,553 A | * 9/1998 | Pinault et al. | 370/419 |
| 5,898,888 A | 4/1999 | Guthrie et al. | |

* cited by examiner

Primary Examiner—Min Jung
(74) Attorney, Agent, or Firm—Robert E. Bushnell, Esq.

(57) ABSTRACT

A system for controlling a TD-bus connected to telephony devices includes a Versa Module European (VME) bus, a VME slave card connected through the TD-bus to the telephony devices, and a main controller connected through the VME bus to the VME slave card to control the telephony devices. The main controller generates a control command transferred through the VME slave card to the telephony devices. The VME slave card stores the resultant data obtained from controlling the telephony devices, and the main controller controls the TD-bus according to the resultant data.

21 Claims, 4 Drawing Sheets

FIG. 1 *(Related Art)*

SYSTEM FOR CONTROLLING A TELEPHONY DEVICE BUS IN A SWITCHING SYSTEM

CLAIM OF PRIORITY

This application makes reference to, incorporates the same herein, and claims all benefits accruing under 35 U.S.C. §119 from my application SYSTEM FOR CONTROLLING TELEPHONY DEVICE BUS IN A SWITCHING SYSTEM filed with the Korean Industrial Property Office on Aug. 19, 1998 and there duly assigned Serial No. 33659/1998.

BACKGROUND OF THE INVENTION

1. Field of the Invention

The present invention relates to a switching system, and more particularly to a system for controlling telephony device control buses by sub-controllers in a switching system.

2. Description of the Related Art

In an earlier switching system, the telephony device buses (TD-buses) are controlled by a main controller and separate sub-controllers by communicating through an HDLC (High-level Data Link Control) or IPC (Interprocess communication) protocol. For example, a TDX-10 series system has a main processor hardware block (MPH) as the main controller and a peripheral processor hardware block (PPH) as the sub-controllers. A TDX-10 series system has a TD-bus control system which includes a main controller connected through a P-bus with a plurality of sub-controllers for IPC. Each of the sub-controllers has four ports connected through a TD-bus with telephony devices.

In operation, each sub-controller transmits the state information of the telephony device to the main controller by means of the IPC. Then, the main controller sends a command for controlling the telephony device to the corresponding sub-controller by means of the IPC. The sub-controller controls the telephony device according to the command. Thus, the control system employing such a serial transmission protocol is divided into two control levels to control the telephony devices by means of load sharing. This increases the number of the circuit cards needed for the control system, thereby degrading reliability of the data transmission on multiple bus stages. Besides, the protocol control and program job for IPC complicates the control of the telephony device, adversely affecting the performance of the control system.

Each of the following patents discloses features in common with the present invention but do not teach or suggest a system for controlling a telephony device bus in a switching system as in the present invention: U.S. Pat. No. 5,371,736 to Evan, entitled UNIVERSAL PROTOCOL PROGRAMMABLE COMMUNICATIONS INTERFACE, issued on Dec. 6, 1994; U.S. Pat. No. 5,265,237 to Tobias et al., entitled BYTE SWAPPING APPARATUS FOR SELECTIVELY REORDERING BYTES OF AN N-BIT WORD COMMUNICATED BETWEEN AN AT COMPUTER AND VME BUS, issued on Nov. 23, 1993; U.S. Pat. No. 5,321,818 to Wendling et al., entitled SYSTEM FOR ARBITRATING FOR ACCESS ON VME BUS STRUCTURES, issued on Jun. 14, 1994; U.S. Pat. No. 5,414,814 to McKim, entitled I/O INTERFACE BETWEEN VME BUS AND ASYNCHRONOUS SERIAL DATA COMPUTER, issued on May 9, 1995; U.S. Pat. No. 5,748,916 to Conway et al., entitled VXIBUS DEVICE WHICH INTELLIGENTLY MONITORS BUS CONDITIONS AND BEGINS EARLY CYCLES FOR IMPROVED PERFORMANCE, issued on May 5, 1998; U.S. Pat. No. 5,590,372 to Dieffenderfer et al., entitled VME BUS TRANSFERRING SYSTEM BROADCASTING MODIFIERS TO MULTIPLE DEVICES AND THE MULTIPLE DEVICES SIMULTANEOUSLY RECEIVING DATA SYNCHRONOUSLY TO THE MODIFIERS WITHOUT ACKNOWLEDGING THE MODIFIERS, issued on Dec. 31, 1996; and U.S. Pat. No. 5,898,888 to Guthrie et al., entitled METHOD AND SYSTEM FOR TRANSLATING PERIPHERAL COMPONENT INTERCONNECT (PCI) PEER-TO-PEER ACCESS ACROSS MULTIPLE PCI HOST BRIDGES WITHIN A COMPUTER SYSTEM, issued on Apr. 27, 1999.

SUMMARY OF THE INVENTION

It is an object of the present invention to provide a system for controlling the TD-bus connected to telephony devices.

According to an aspect of the present invention, a system for controlling a TD-bus connected to telephony devices comprises: a Versa Module European (VME) bus, a VME slave card connected through the TD-bus to the telephony devices, and a main controller connected through the VME bus to the VME slave card to control the telephony devices. The main controller generates a control command transferred through the VME slave card to the telephony devices. The VME slave card stores the resultant data obtained by controlling the telephony devices, and the main controller controls the TD-bus according to the resultant data.

The present invention will now be described more specifically with reference to the drawings attached only by of example.

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
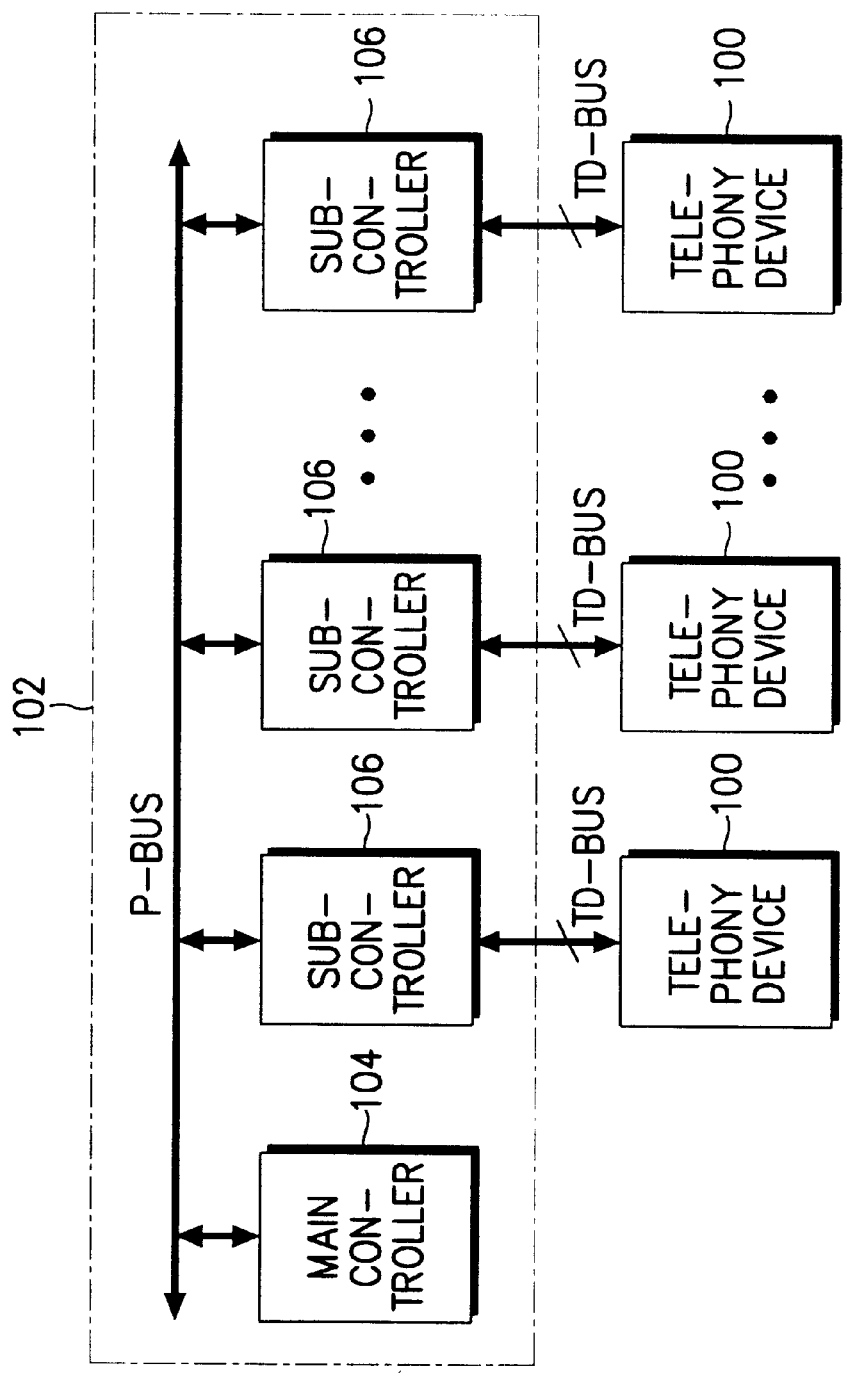
FIG. 1 is a block diagram illustrating a TD-bus control system used in a switching system.

FIG. 1 illustrates the TD-bus control system discussed in detail in the Description of the Related Art above.

In FIG. 1, the TD-bus control system 102 includes a main controller 104 connected through a P-bus with a plurality of sub-controllers 106 for IPC. Each of the sub-controllers 106 has four ports connected through a TD-bus with telephony devices 100.

Figure 2:
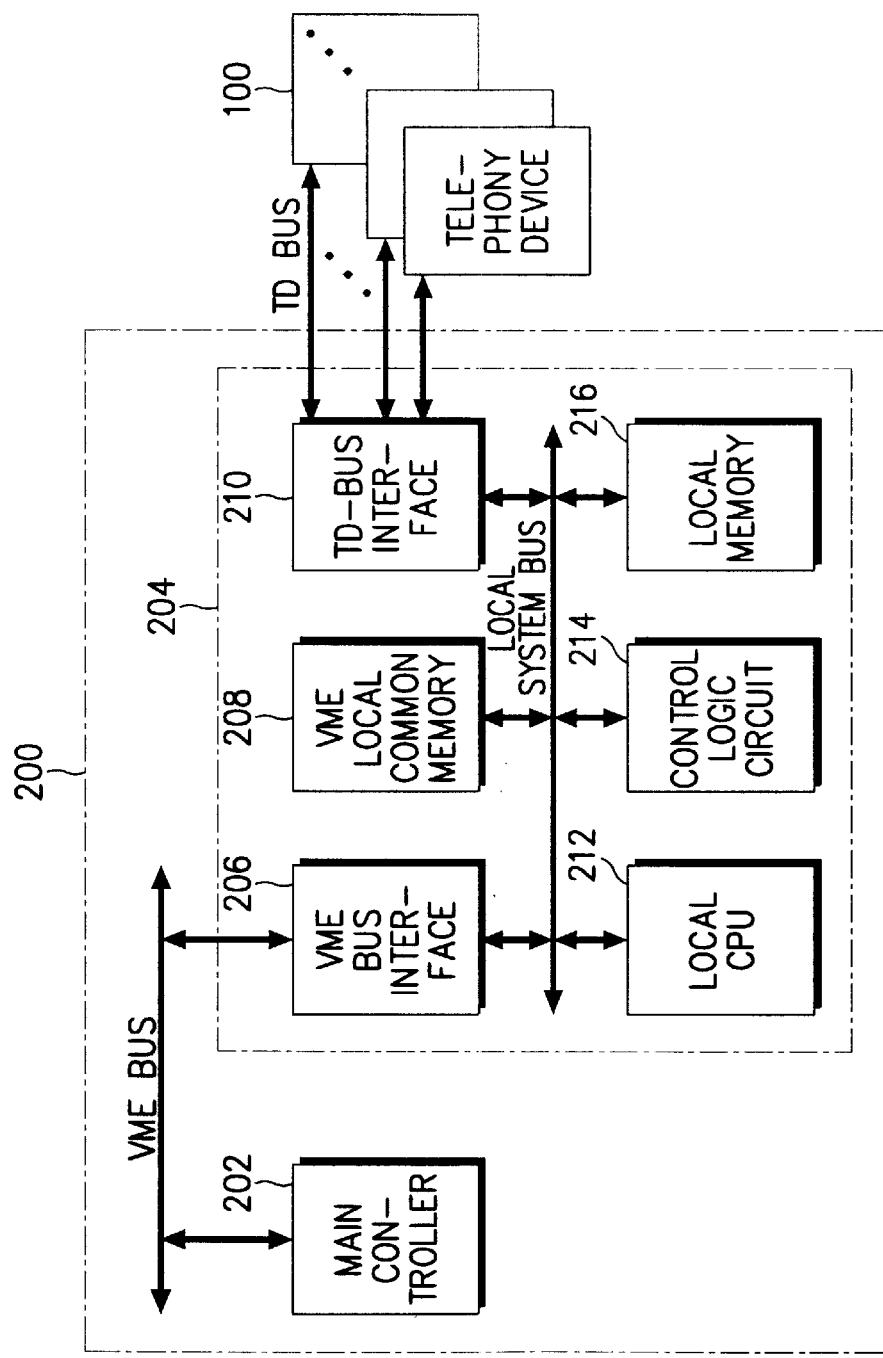
FIG. 2 is a block diagram illustrating a system for controlling the TD-bus connected to telephony devices according to the present invention.

Referring to FIG. 2, a control system 200 for controlling telephony devices 100 comprises a main controller 202 connected through a VME bus to a VME slave card 204.

Instead of an IPC bus supporting the serial transmission protocol, the VME bus makes it possible to construct the sub-controller for controlling the telephony devices in the form of a memory card to improve the control performance. The data transmission rate of the VME bus is 40 Mbps, compared to that of the IPC which is 8 Mbps. This structure considerably simplifies and improves the control system by incorporating the functions of conventional sub-controllers into the VME slave card to interface with the telephony devices.

The main controller 202 generates a control command to the VME slave card 204 to control the telephony devices, and controls the TD-bus according to the resultant data stored in the VME it slave card. The VME slave card 204 is connected through the TD-bus to the telephony devices 100 to transfer the control command to the telephony devices 100, and then stores the resultant data obtained by controlling the telephony devices 100.

The VME slave card 204 further comprises a VME bus interface 206, a VME local common memory 208, a TD-bus interface 210, a local CPU 212, a control logic circuit 214, and local memory 216. The VME bus interface 206 is connected to the internal local system bus to interface the VME slave card with the VME bus. The VME local common memory 208 is also connected to the local system bus to store the command and resultant data. Also connected to the local system bus, the TD-bus interface 210 interfaces the VME slave card with the TD-bus. The local CPU 212 is connected to the local system bus to periodically store the resultant data in the VME local common memory 208 and to transfer an interrupt signal to the main controller 202. The control logic circuit 214 generates control signals to control the local system bus. The local memory 216 is connected to the local system bus to provide the local CPU 212 with a working memory region.

Figure 3:
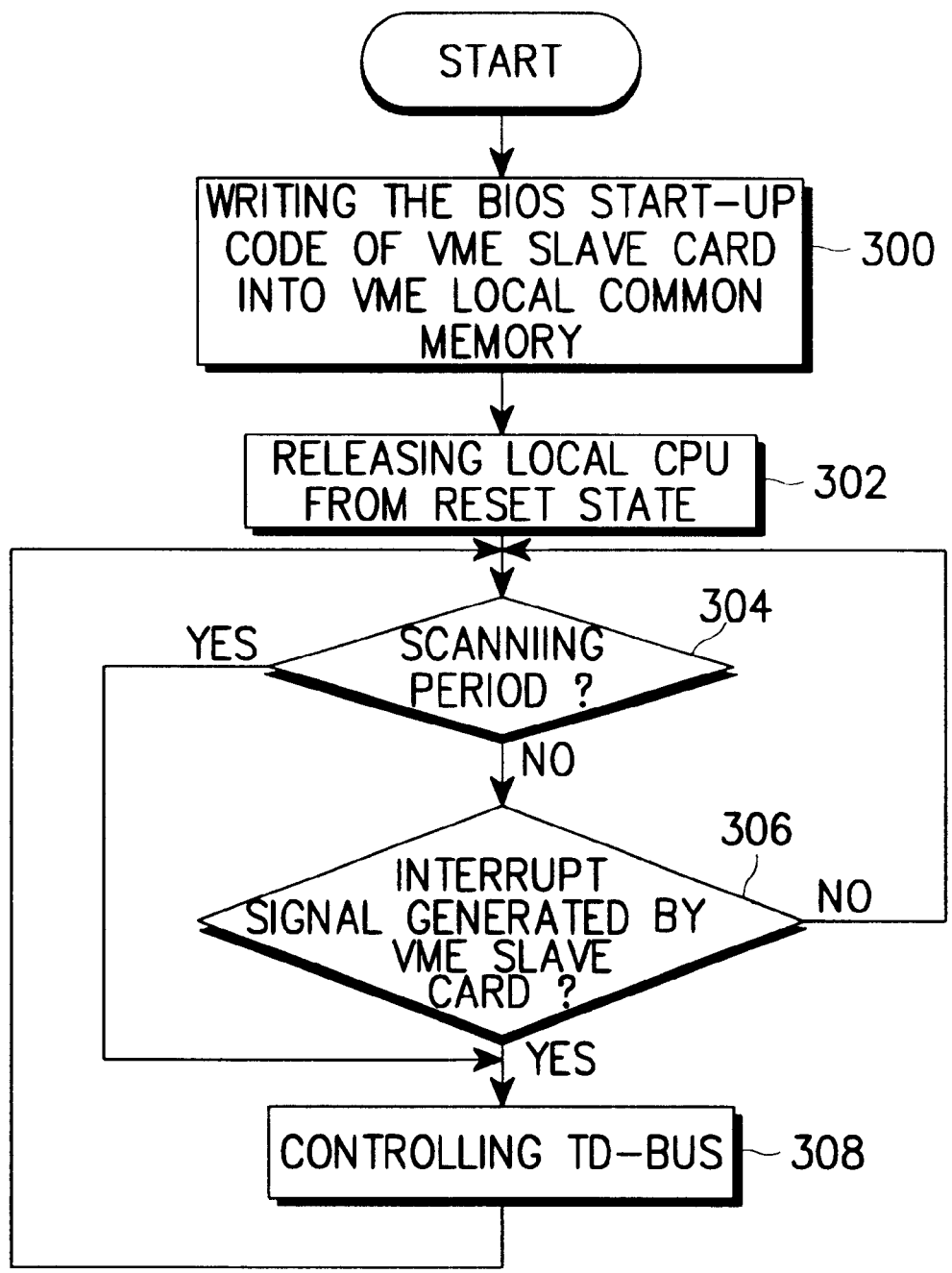
FIG. 3 is a flowchart illustrating the processing steps of the main controller shown in FIG. 2.
Figure 4:
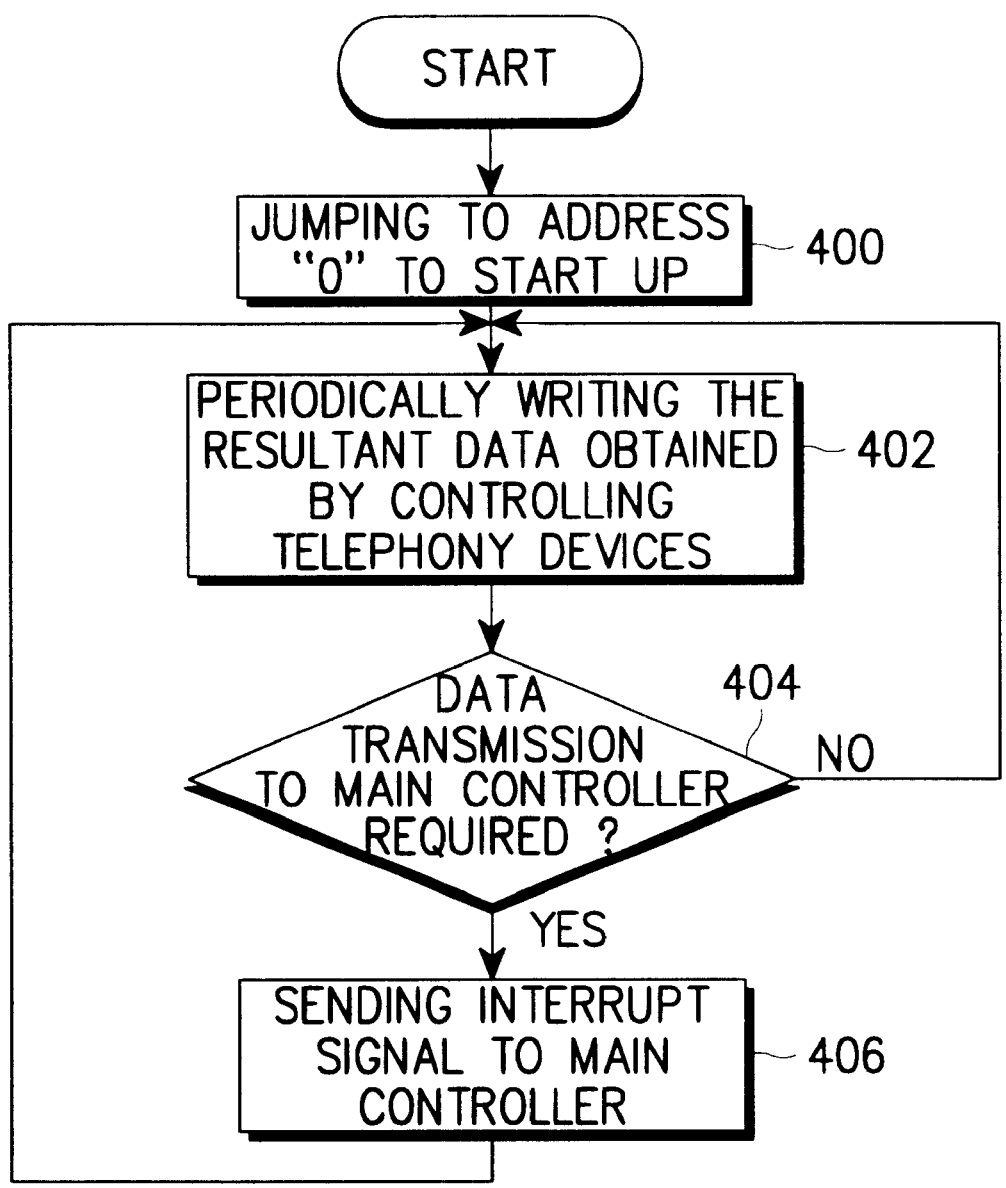
FIG. 4 is a flowchart illustrating the processing steps of the local CPU shown in FIG. 2.

Describing the process of controlling the TD-bus in connection with FIGS. 3 and 4, the main controller 202 contains a BIOS (Basic Input-Output System) start-up code of the VME slave card 204, writing it through the VME bus into the VME local common memory 208 in step 300 of FIG. 3. Then, the main controller 202 releases the local CPU 212 from its reset state in step 302.

Consequently, the local CPU 212 jumps to the address "0" to start up in step 400 of FIG. 4, which address indicates the VME local common memory 208. The VME slave card 204 operates according to the codes of the VME local common memory 208, communicating through a given region of the VME local common memory 208 with the main controller 202. After starting up, the local CPU 212 operates the local memory 216 to control the telephony devices 100 through the TD-bus, periodically writing the resultant data in the VME local common memory 208, in step 402. Then, the local CPU 212 determines in step 404 whether it is required to transmit the resultant data to the main controller 202. If so, it sends an interrupt signal to the main controller 202 in step 406, then repeating the steps 402 to 404.

Consequently, the main controller 202 detects through steps 304 and 306 whether the scanning period has come or an interrupt signal has been generated by the VME slave card 204. If so, the main controller 202 controls the TD-bus in step 308, then repeating the steps 304 and 306.

As described above, the main controller 202 combines a main controller and sub-controllers into a single module to control the TD-bus by means of VME communication, simplifying the structure and improving the performance of the control system. Besides, the TD-bus ports of separate sub-controllers distributed over the IPC bus are concentrated in the VME slave card 204 as a TD-bus interface, eliminating the faults caused by multiple communication paths.

While the present invention has been described with specific embodiments accompanied by the attached drawings, it will be appreciated by those skilled in the art that various changes and modifications may be made thereto without departing from the gist of the present invention.

What is claimed is:

1. A system for controlling a telephony device bus (TD-bus) connected to telephony devices, comprising:

a Versa Module European (VME) bus;

a VME slave card connected through said TD-bus to said telephony devices; and a main controller connected through said VME bus to said VME slave card for controlling said telephony devices, said main controller generating a control command transferred through said VME slave card to said telephony devices, said VME slave card storing the resultant data obtained from controlling said telephony devices, and said main controller controlling said TD-bus according to said resultant data.

2. A system as defined in claim 1, said VME slave card comprising:

a VME bus interface connected to a local system bus for interfacing said VME slave card with said VME bus;

a VME local common memory connected to said local system bus for storing said control command and said resultant data;

a TD-bus interface connected to said local system bus for interfacing said VME slave card with said TD-bus;

a local CPU connected to said local system bus for periodically storing said resultant data in said VME local common memory and for transferring an interrupt signal to said main controller;

a control logic circuit connected to said local system bus for generating control signals supplied to said local system bus; and a local memory connected to said local system bus for providing said local CPU with a working memory region.

3. A system as defined in claim 2, said main controller controlling said TD-bus by periodically scanning said VME local common memory and receiving said interrupt signal.

4. A method of controlling a telephony device bus (TD-bus) connected to telephony devices, the method comprising the steps of:

providing a Versa Module European (VME) bus;

connecting a VME slave card to said telephony devices through said TD-bus; and connecting a main controller to said VME slave card through said VME bus for controlling said telephony devices and generating a control command with said main controller, the control command being transferred through said VME slave card to said telephony devices, storing the resultant data obtained from controlling said telephony devices in said VME slave card, and controlling said TD-bus with said main controller according to said resultant data.

5. The method as defined in claim 4, further comprising the steps of:

interfacing said VME slave card with said VME bus through a VME bus interface connected to a local system bus;

storing said control command and said resultant data in a VME local common memory connected to said local system bus;

interfacing said VME slave card with said TD-bus through a TD-bus interface connected to said local system bus;

periodically storing said resultant data in said VME local common memory and transferring an interrupt signal to said main controller with a local CPU connected said local system bus;

generating control signals supplied to said local system bus with a control logic circuit connected to said local system bus; and providing said local CPU with a working memory region in a local memory connected to said local system bus.

6. The method as defined in claim 5, further comprising the step of controlling said TD-bus by periodically scanning said VME local common memory and receiving said interrupt signal with said main controller.

7. A system for controlling a telephony device bus (TD-bus) connected to telephony devices, comprising:

a Versa Module European (VME) bus;

a VME slave card connected through said TD-bus to said telephony devices; and a main controller connected through said VME bus to said VME slave card for controlling said telephony devices, said main controller generating a control command transferred through said VME slave card to said telephony devices;

said VME slave card comprising a local system bus and a VME local common memory connected directly to said local system bus for receiving and storing said control command and resultant data obtained from controlling said telephony devices.

8. A system as defined in claim 7, said main controller controlling said TD-bus according to said resultant data.

9. A system as defined in claim 7, said VME slave card further comprising a VME bus interface connected directly to said local system bus for interfacing said VME slave card with said VME bus.

10. A system as defined in claim 7, said VME slave card further comprising a TD-bus interface connected directly to said local system bus for interfacing said VME slave card with said TD-bus.

11. A system as defined in claim 7, said VME slave card further comprising a local CPU connected directly to said local system bus for periodically storing said resultant data in said VME local common memory, and for transferring an interrupt signal to said main controller.

12. A system as defined in claim 11, said main controller controlling said TD-bus by periodically scanning said VME local common memory and receiving said interrupt signal.

13. A system as defined in claim 11, said VME slave card further comprising a local memory connected directly to said local system bus for providing said local CPU with a working memory region.

14. A system as defined in claim 7, said VME slave card further comprising a control logic circuit connected directly to said local system bus for generating control signals supplied to said local system bus.

15. A system for controlling a telephony device bus (TD-bus) connected to telephony devices, comprising:

a Versa Module European (VME) bus;

a VME slave card connected, through said TD-bus to said telephony devices; and a main controller connected through said VME bus to said VME slave card for controlling said telephony devices, said main controller generating a control command transferred through said VME slave card to said telephony devices;

said VME slave card comprising a local system bus and a TD-bus interface connected directly to said local system bus for interfacing said VME slave card with said TD-bus.

16. A system as defined in claim 15, said VME slave card further comprising a VME bus, interface connected directly to said local system bus for interfacing said VME slave card with said VME bus.

17. A system as defined in claim 15, said VME slave card further comprising a VME local common memory connected directly to said local system bus for storing said control command and resultant data.

18. A system as defined in claim 17, said VME slave card further comprising a local CPU connected directly to said local system bus for periodically storing said resultant data in said VME local common memory, and for transferring an interrupt signal to said main controller.

19. A system as defined in claim 18, said main controller controlling said TD-bus by periodically scanning said VME local common memory and receiving said interrupt signal.

20. A system as defined in claim 18, said VME slave card further comprising a local memory connected directly to said local system bus for providing said local CPU with a working memory region.

21. A system as defined in claim 15, said VME slave card further comprising a control logic circuit connected directly to said local system bus for generating control signals supplied to said local system bus.

* * * * *